United States Patent
Corn et al.

[15] 3,649,796
[45] Mar. 14, 1972

[54] FASTENER STRUCTURE FOR HOUSING MEANS

[72] Inventors: Prentice R. Corn; Wallace A. Gebhardt, both of Logansport, Ind.

[73] Assignee: Switches, Incorporated

[22] Filed: Dec. 14, 1970

[21] Appl. No.: 97,677

[52] U.S. Cl. ........................... 200/168 R, 74/531, 220/40 R
[51] Int. Cl. ........................................................ H01h 9/02
[58] Field of Search ................... 24/211 K; 200/61.54, 61.55, 200/61.56, 61.57, 168 R, 168 B, 168 C, 166 CT, 168 G; 220/40 R; 74/531

[56] References Cited

UNITED STATES PATENTS

| | | | |
|---|---|---|---|
| 2,446,141 | 7/1948 | Parsons | 200/168 C |
| 1,662,422 | 3/1928 | Hodges | 200/168 C |
| 3,369,691 | 2/1968 | Wei | 220/40 R |
| 2,177,123 | 10/1939 | Wittenberg | 220/40 R |
| 3,246,112 | 4/1966 | Adams et al. | 200/168 G |

*Primary Examiner*—H. O. Jones
*Attorney*—Dressler, Goldsmith, Gordon & Ladd

[57] ABSTRACT

A standard, including a plurality of circumferentially spaced downwardly opening cavities, is releasably connected to a support, which includes a plurality of mounting members each received within one cavity. A fastener is slidably inserted in each cavity, and is permanently retained therein by locking tabs that bite into the end walls of each cavity. Each fastener includes an opening having an enlarged portion adapted to be slidably positioned over a mounting member, and detent portions adjacent the enlarged portion which spread outwardly as the standard is rotated relative to the support. The fasteners include inclined retention portions on the opposite side of the opening from the enlarged portion which bite into the mounting members to positively prevent axial separation of the standard from the support.

25 Claims, 8 Drawing Figures

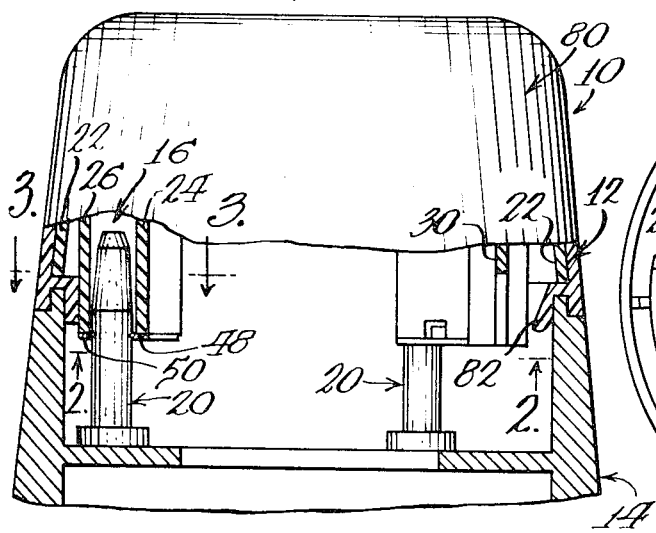
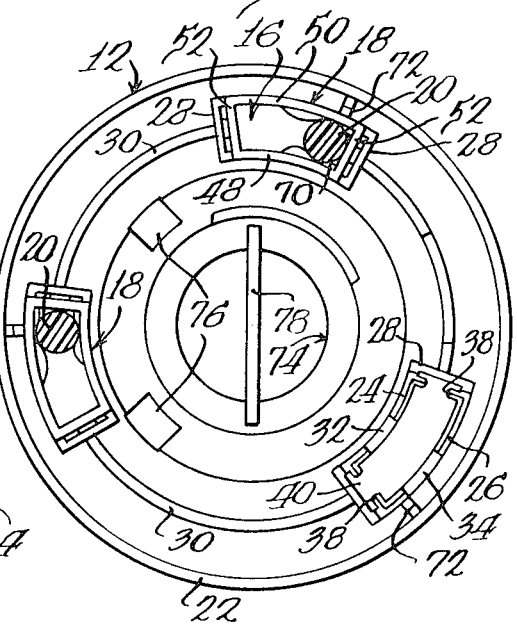
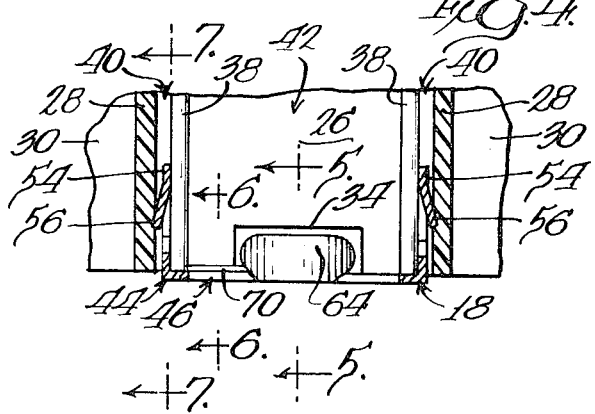
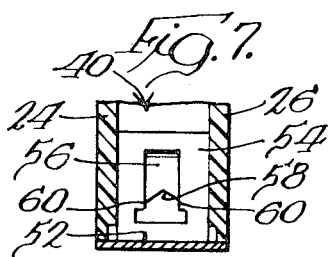

FASTENER STRUCTURE FOR HOUSING MEANS

BACKGROUND OF THE INVENTION

In many diverse environments it is desirable to provide a connection between two members that will positively hold the members against separation by the movement of one member relative to the other member in a given direction, but which will readily allow the members to be separated when one member is moved relative to the other member in another direction. For example, it is often desirable to connect two members together in a manner so as to positively prevent axial separation of the members, while at the same time providing a capability for separating the members from one another, as by rotating one element relative to the other element.

Heretofore, structural arrangements for a connection of the type described above have not always been satisfactory, in that such arrangements have not provided a sufficiently positive separation prevention means, or have been so complex and costly as to make the arrangement economically unfeasible, even though the separation prevention means was positive. Prior art arrangements have also been characterized by being difficult to assemble and disassemble, and very often components of the structural arrangement were irreparably damaged during either the assembly or disassembly steps.

SUMMARY OF THE INVENTION

The present invention obviates the problems noted above by providing a unique fastener member which cooperates with a novel standard to provide a connection means that may be easily and quickly assembled without damaging the components, which positively hold the standard against axial separation relative to a support once assembled, and which allows the standard to be quickly and easily disassembled from the support, when desired, without damage to any of the structural components.

The standard of the present invention has particular utility as a reinforcing member in a momentary switch of the type that is mounted on the steering column of a vehicle. Such a switch is disclosed in detail and claimed in the commonly assigned Wolf et al. application, Ser. No. 94,240 entitled IMPROVED MOMENTARY CONTACT SWITCH filed Dec. 1, 1970, and the disclosure of such application is hereby expressly incorporated by reference in its entirety in the present application.

The standard of the present invention includes a plurality of circumferentially spaced downwardly opening cavities that are interconnected by arcuate upright members. Each cavity is defined by arcuate inner and outer, or side, walls that are parallel with one another and that are connected at their outer ends by planar end walls which converge toward one another from the outer side wall to the inner side wall. Intermediate walls are provided in closely spaced, parallel relationship with each end wall to divide each cavity into an enlarged central compartment flanked by narrow upright slideways. A fastener is slidably inserted in each cavity, and is positively retained therein.

Each fastener includes a generally planar base section having a central opening therein that is arcuate and positioned in alignment with the central compartment of its respective cavity. Each fastener includes a pair of legs that extend perpendicularly outwardly from opposite ends of the base section, with each leg being slidably received in one of the aforementioned upright slideways. Inclined locking tabs are struck outwardly from each leg of the fastener, and the tabs do not interfere with the slidable insertion of the fastener into the cavity; however, the free ends of the tabs are provided with a pronged locking configuration that positively prevents the fasteners from being removed from the cavities by virtue of the biting engagement of the prongs with the end walls of the cavity.

The base portion of each fastener is generally flat and coplanar, and portions thereof are positioned in face abutting engagement with portions of the bottom surface of the sidewalls of the standard cavities. The sidewalls of the cavities include clearance notches that allow arcuate detent portions of the fastener to flex outwardly when the standard is assembled to a support. The support includes a plurality of upright mounting members that impale the openings in the fasteners, and the detent portions of the fasteners restrict the width of the opening to a dimension less than the diameter of the fastener member. The portion of the opening of each fastener at one side of the detent has a width that is slightly in excess of the diameter of the fastening members, so that the standard may be readily positioned over the support prior to movement of the standard relative to the support, and the portion of the opening of the fasteners on the opposite side of the detents include inclined flanges that bite into opposite sides of the mounting members to positively prevent the standard from being axially separated from the support.

BRIEF DESCRIPTION OF THE DRAWINGS

FIG. 1 is a side elevational view, partly in section, illustrating a preferred form of the fastening structure of the present invention;

FIG. 2 is a bottom plan view, partly in section, taken generally along line 2—2 of FIG. 1;

FIG. 3 is an enlarged sectional view taken generally along line 3—3 of FIG. 1;

FIG. 4 is a sectional view taken generally along line 4—4 of FIG. 3;

FIGS. 5, 6, and 7 are sectional views taken generally along lines 5—5, 6—6, and 7—7, respectively, of FIG. 4; and FIG. 8 is a view similar to FIG. 3, and illustrates a further embodiment of the invention.

DETAILED DESCRIPTION

While this invention is susceptible of embodiment in many different forms, there is shown in the drawings and will herein be described in detail a preferred embodiment of the invention, and a modification thereof, with the understanding that the present disclosure is to be considered as an exemplification of the principles of the invention and is not intended to limit the invention to the embodiment illustrated. The scope of the invention will be pointed out in the appended claims.

Referring now to the drawings in detail, the connection assembly of the present invention is illustrated in its entirety at 10 in FIG. 1 and includes a standard 12 that is adapted to be connected to a support 14, such as the steering wheel of a motor vehicle. Standard 12 includes a plurality of circumferentially spaced, downwardly opening cavities 16, each of which has a fastener member 18 mounted therein. Upright mounting members 20 are fixed to support 14 at circumferentially spaced locations corresponding to the spacing of cavities 16, and each member 20 impales a cavity 16 to releasably mount the standard 12 on the support 14, as will hereinafter appear.

Standard 12 is formed of an electrically insulating material, such as a suitable plastic, and includes a generally frustoconical outer wall 22. Cavities 16 are spaced radially inwardly of outer wall 22, and as can be best seen in FIG. 3, each cavity 16 is circumscribed by an arcuate inner side wall 24, an arcuate outer side wall 26 parallel with wall 24, and planar end walls 28 that converge toward one another from outer wall 26 to inner wall 24. Cavity side walls 24 and 26 include clearance notches 32 and 34, respectively, at the lower end thereof that allow portions of the fasteners 18 to flex outwardly during assembly, as will hereinafter appear. Each cavity 16 further includes intermediate wall means 36, defined by spaced wall sections 38, that are parallel with end walls 28 in close proximity thereto. Wall sections 38 cooperate with end walls 28 to provide narrow vertical slideways 40 (FIG. 4) at each end of cavities 16, and to provide an enlarged arcuate compartment 42 centrally of each cavity.

Each fastener 18 includes a base portion 44 having a central opening 46 (FIG. 4) therein, and base portion 44 is defined by flat, generally arcuately shaped inner and outer portions 48 and 50, respectively, that are connected by end portions 52 that converge from outer portion 50 toward inner portion 48. As is evident from FIG. 6, the lower portion of casing side walls 24 and 26, on opposite sides of notches 32 and 34, respectively, are provided with coplanar bottom portions 24a and 26a that provide bearing surfaces that are positioned in face abutting engagement with fastener base portions 48 and 50, respectively.

Fasteners 18 are provided with legs 54 at opposite ends thereof that are disposed perpendicularly with respect to base 44, and which are slidably received in slideways 40. Each leg 54 is provided with an outwardly struck inclined tab 56 that is provided with a locking configuration at the free end thereof, which includes a recessed central portion 58 (FIG. 7) that provides sharpened prongs 60 at opposite sides of each tab 56. Fasteners 18 are preferably formed of a metallic material that is substantially harder than the material from which casing 12 is formed, so that while the fasteners 18 may be freely slidably inserted within the cavities 16, the prongs 60 will positively bite into the end walls 28 to positively and effectively prevent removal of the fasteners 18 from the standard 12 once they have been inserted in the cavity.

Fasteners 18 further include detents 62 and 64 that extend generally perpendicularly with respect to base portion 44. Detents 62 and 64 extend upwardly into cavities 16 from base portions 48 and 50, respectively, with detent 62 being aligned with notch 32 and detent 64 being aligned with notch 34, as can be readily seen in FIG. 5. As is evident from FIG. 3, detents 62 and 64 are arcuate in cross section to provide a camming surface that is engageable with mounting members 20, as will herein after appear. The facing portions of detents 62 and 64 serve to restrict the width of the opening 46 in the base portion 44 of the fasteners 18, and the width of the restricted passage portion 66 is less than the diameter of mounting members 20.

The openings 46 in fasteners 18 include holding means 68 at one side of detents 62 and 64, with the holding means being defined by inclined flanges 70 that extend upwardly at an angle with respect to base portions 48 and 50, as can be best seen in FIG. 6. The free ends of flanges 70 are spaced apart by a distance that is less than the diameter of mounting members 20, so that as the standard 12 is rotated relative to the support 14 to move the flanges 70 into engagement with the mounting members 20, a positive axial retention force is provided by virtue of the capability of the flanges 70 to bite into the relatively softer mounting members 20. Webs 72 extend radially outwardly from cavity walls 26 to the outer wall 22 of standard 12 outwardly of flanges 70 to reinforce the holding means after the reinforcing member has been assembled to the support.

While the mounting structure of the present invention is not limited to any particular environment, as is mentioned above, the structure of the present invention has particular utility in connection with the connection of a momentary horn switch to the steering wheel of a motor vehicle. As is described in detail in the concurrently filed application mentioned above, the top surface 74 (FIG. 2) of the standard 12 is irregularly shaped and supports switch contacts (not shown) in an annular upwardly facing recess adjacent the upper end thereof. The switch contacts are held in spaced relationship with respect to one another by annular insulation members (not shown), and connection portions of the contacts extend downwardly through openings 76 in the top wall 74 of the standard 12. A diametrically extending bar 78 extends below top wall 74 to support the terminal wires (not shown) that are secured to the connection portions of the switch contacts that extend through openings 76, as is also explained in the above mentioned concurrently filed application. A generally frustoconically shaped resilient housing 80 surrounds the standard 12, and the flexible upper portion of casing 80 is manually depressable to move the switch contacts into engagement with one another to complete an electric circuit to a horn switch, or the like, as is explained in detail in the above mentioned concurrently filed application. The casing 80 includes a flanged configuration 82 at the lower end thereof that mates with a flanged configuration at the upper end support 14, in an exemplary embodiment of the invention.

While the connection means of the present invention has been heretofore described as having particular utility in connection with a momentary contact switching device, it should be understood that the present invention is not limited to any particular environment, and in fact, has general utility in many environments where it is desired to detachably connect one member to another member.

In operation, the fastener members 18 are initially slidably inserted into each of the cavities 16. The inclination of the tabs 56 on legs 54 of the fastener members allow the legs 54 of the fasteners to be freely slidably inserted within the slideways 40. The locking configuration provided by prongs 60 provides a positive retention means that prevents the fasteners 18 from being axially disassociated from the support 14.

The mounting members 20 and the cavities 16 have a predetermined angular orientation relative to one another so that the standard 12 can be assembled on the support 14 in only one position. In this respect, with reference to FIG. 2, the left-hand cavity 16 may be spaced from the upper cavity 16 by an angular amount that is essentially equal to the angular spacing between the upper cavity 16 and the right-hand cavity 16, while the left-hand and right-hand cavities 16 are spaced from one another by a larger angle. The mounting members 20 have a corresponding angular orientation, and in this manner, proper alignment of the standard 12 relative to the support 14 is insured.

Since the base portions 48 and 50 are positively seated against the backing surfaces 24a and 26a of the cavity walls 24 and 26, if it is attempted to assemble an improperly aligned standard 12 to the support 14, the fasteners 18 will not be damaged since surfaces 24a and 26a will effectively resist deformation of the fasteners. Since the openings 46 in the fasteners include an end portion that is slightly larger in diameter than the mounting members 20, once the standard 12 is properly angularly oriented relative to the support 14, the standard 12 may be moved axially downwardly relative to the support, so that the fasteners 20 impale the ends of openings 46 opposite from the holding means 68. The upper ends of mounting members 20 are preferably tapered to facilitate the positioning of the standard 12 relative to the support 14.

Once the standard 12 has been telescoped over the mounting members 20, with the flanged configuration 82 in position over the upper end of support 14, the standard 12 is rotated in a clockwise direction and the mounting members 20 cause the arcuate detent portions 62 and 64 to flex outwardly as the mounting members move therepast. Openings 32 and 34 in casing walls 24 and 26, respectively, allow the detent portions 62 and 64 to flex outwardly during movement of the mounting members 20 relative thereto. Continued clockwise movement of the standard 12 relative to the support 14 causes the detents 62 and 64 to clear the mounting members 20, whereupon the inclined flange portions 70 bite into diametrically opposed portions of the mounting members 20 to positively prevent the standard 12 from being axially separated from the support 14.

The detents 62 and 64 restrict the openings 46 in the fasteners to an extent that the standard 12 cannot be moved counterclockwise relative to the support 14 by vibration or other incidental forces applied thereto during use. However, if it is desired to remove the standard 12 from the support 14, the detenting forces can be overcome by moving the standard 12 in a counterclockwise direction so that the detents 62 and 64 will clear the mounting members 20 and allow the mounting members to move into the enlarged portions of openings 46 so that the standard 12 can be axially displaced from the support 14.

While the present invention has illustrated three downwardly opening cavities in a standard, and a fastener in each opening, it should be understood that the invention is not limited to any specific numbers of cavities or fasteners, and that more or less than three can be utilized without departing from the spirit and scope of the present invention.

Furthermore, while the cavities and fasteners have been illustrated as having an arcuate configuration, the present invention is not limited to any specific shaped structures or openings, and linear slots or openings of other configurations may be utilized, if desired.

In FIG. 8, a further embodiment of the invention is illustrated that is similar to the previously described embodiment, so that similar reference numerals have been used to designate corresponding elements, with the reference numerals in FIG. 8 having been increased by the sum 100. The fastener 118 of FIG. 8 differs essentially from the previously described embodiment in that the base portion of the fastener is generally rectangular and defined by spaced parallel side walls 148 and 150 and spaced parallel end walls 152 disposed perpendicularly with respect to side walls 148 and 150. The fastener 118 includes vertical legs 154 having outwardly struck tabs 156 thereon, with the legs 154 being slidably positionable within spaced parallel slideways in the cavity 116 of standard 112.

As with the previously described embodiment, fastener 118 includes arcuate detent portions 162 and 164 extending outwardly from base sides 148 and 150, respectively, with flanges 170 being provided on base portions 148 and 150 at one side of detents 162 and 164. It will be readily understood that in use, the casing 112 is positioned over a mounting member, not shown, and the casing 112 is moved rectilinearly relative to the mounting member which spreads the detents 162 and 164 outwardly and enables the holding flanges 170 to bite into diametrically opposed portions of the mounting member to positively secure the standard 112 to the mounting member.

What is claimed is:

1. A fastener comprising: a substantially flat base having an elongate opening therein; first and second legs extending generally perpendicular with respect to said base at opposite ends thereof, each leg having an outwardly extending locking portion adapted to engage a wall of a cavity to prevent removal of the fastener from the cavity; a detent at one side of said opening between the ends thereof, said detent extending generally perpendicularly with respect to said base and partially restricting said opening; and holding means on said base at one side of said detent and extending into said opening to provide a means for positively engaging a mounting member.

2. A fastener as set forth in claim 1 in which said base, legs and detent and holding means are all portions of a unitary metallic member.

3. A fastener as set forth in claim 1 in which said legs and detent extend in the same direction away from said base.

4. A fastener as set forth in claim 1 in which said locking portions are each defined by a tab struck from its respective leg, each tab having a locking configuration at the free end thereof.

5. A fastener as set forth in claim 4 in which each tab is struck outwardly from its respective leg with its free end facing toward said base.

6. A fastener as set forth in claim 5 in which the free end of each tab has a recessed central portion providing spaced prongs which provide said locking configuration.

7. A fastener as set forth in claim 1 in which a pair of detents and a pair of holding means are provided at opposite sides of said opening.

8. A fastener as set forth in claim 7 in which said detents are arcuate in cross section.

9. A fastener as set forth in claim 7 in which said holding means are defined by wall sections inclined away from said base.

10. A fastener as set forth in claim 1 in which said base includes spaced inner and outer arcuate walls connected at their outer ends by end walls that converge from said outer wall toward said inner wall, said walls being disposed in a common plane and bordering said opening which has an arcuate configuration.

11. A fastener as set forth in claim 1 in which said base and said opening are generally rectangular, said base being defined by spaced paRallel side walls and spaced parallel end walls perpendicular to said side walls.

12. In combination: a support including a mounting member; a standard mounted on said support and connected to said mounting member, said standard including a downwardly opening cavity defined by spaced end walls and spaced side walls, the bottom of said side walls including generally coplanar portions forming a bearing surface; a fastener positioned in said cavity and including a substantially flat base having an opening therein impaled by said mounting member, portions of said base being positioned in surface abutting engagement with said bearing surface, first and second legs extending generally perpendicularly with respect to said base at opposite ends thereof, each leg extending upwardly into said cavity adjacent an end wall thereof and each leg having an outwardly extending locking portion engaging the adjacent end wall to prevent removal of the fastener member from the cavity, a detent at one side of said opening between the ends thereof, said detent extending generally perpendicularly with respect to said base and restricting said opening to a dimension less than the transverse dimension of the mounting member, and holding means on said base at one side of said detent and extending into said opening to provide a means for positively engaging said mounting member.

13. The combination of claim 12 in which said standard includes intermediate walls spaced from and parallel with said end walls and dividing the cavity into an enlarged central compartment receiving said mounting member and narrow upright slideways flanking said central compartment and receiving the legs of said fastener therein.

14. The combination of claim 12 in which said standard includes a plurality of generally identical cavities at circumferentially spaced locations, each cavity having one of said fasteners therein, said cavities being joined by upright arcuate members, and wherein a mounting member impales the opening of each of said fasteners.

15. The combination of claim 14 in which said standard includes a circumferentially continuous member outwardly of said upright members and cavities, and wherein radial ribs extend between one side wall of each cavity and said circumferentially continuous member.

16. The combination of claim 15 wherein each of said ribs is radially aligned with the holding means of one of said fasteners.

17. The combination of claim 14 in which each of said mounting members has a tapered upper end to facilitate the assembly of said standard to said mounting members.

18. The combination of claim 12 in which said fastener includes a pair of detents at opposite sides of said opening, and wherein the side walls of the cavity of said standard include clearance notches in alignment with said detents to allow said detents to flex outwardly when said standard is moved relative to said mounting member.

19. A standard adapted to be mounted on a support comprising: an upright member; means associated with said upright member forming a downwardly open cavity defined by spaced end walls and spaced side walls, the bottom of said side walls including generally coplanar portions forming a bearing surface; and intermediate wall means spaced from and parallel with each end wall and dividing the cavity into an enlarged central compartment flanked by narrow upright slideways.

20. A standard as set forth in claim 19 in which said end walls are planar and disposed at an angle with respect to one another.

21. A standard as set forth in claim 19 in which said side walls are arcuate and parallel with one another.

22. A standard as set forth in claim 19 in which said side walls are arcuate and parallel with one another, one of said side walls having a greater arcuate length than the other of said side walls; and wherein said end walls are planar and converge from said one side wall to said other side wall.

23. A standard as set forth in claim 22 in which said upright member is annular, and wherein a plurality of cavities are provided at circumferentially spaced positions around said annular member.

24. A standard as set forth in claim 23 in which at least one of said cavities is offset angularly relative to the other cavities.

25. A standard as set forth in claim 19 wherein said upright member and walls are all portions of a unitary member formed of electrically insulating material.

* * * * *